Inventor
Henry John Schaapveld

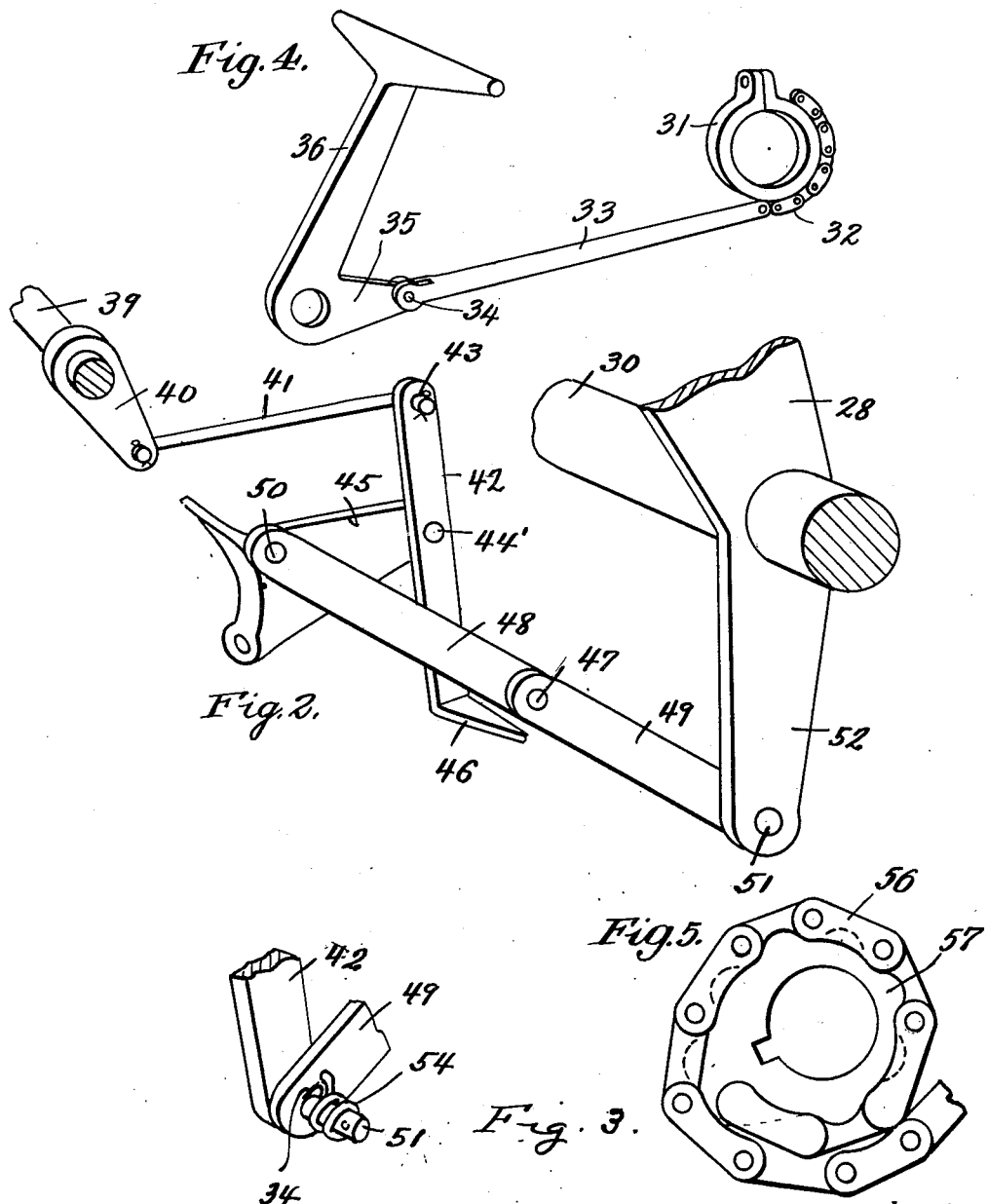

Patented Dec. 5, 1939

2,181,917

UNITED STATES PATENT OFFICE 2,181,917

CULTIVATOR

Henry John Schaapveld, West Liberty, Iowa

Application August 31, 1937, Serial No. 161,834

2 Claims. (Cl. 97—50)

This invention appertains to new and useful improvements in agricultural machines and more particularly to cultivators of the power driven type.

The principal object of the present invention is to provide actuating means for cultivator ground engaging implements whereby the power of the cultivator drive can be utilized for lifting the cultivator implement.

Another important object of the invention is to provide a power operated cultivator wherein the cultivator implement can be either power lifted or manually lifted.

These and various other important objects and advantages of the invention will become apparent to the reader of the following specification.

In the drawings—

Figure 2 is a fragmentary perspective view of the trip mechanism.

Figure 3 is a fragmentary perspective view showing the opposite side of the intermediate connection of the link structure shown in Figure 2.

Figure 4 is a perspective view of the foot pedal and chain assembly.

Figure 5 is a side elevational view of the sprocket and chain partly wound thereon.

Figure 1:
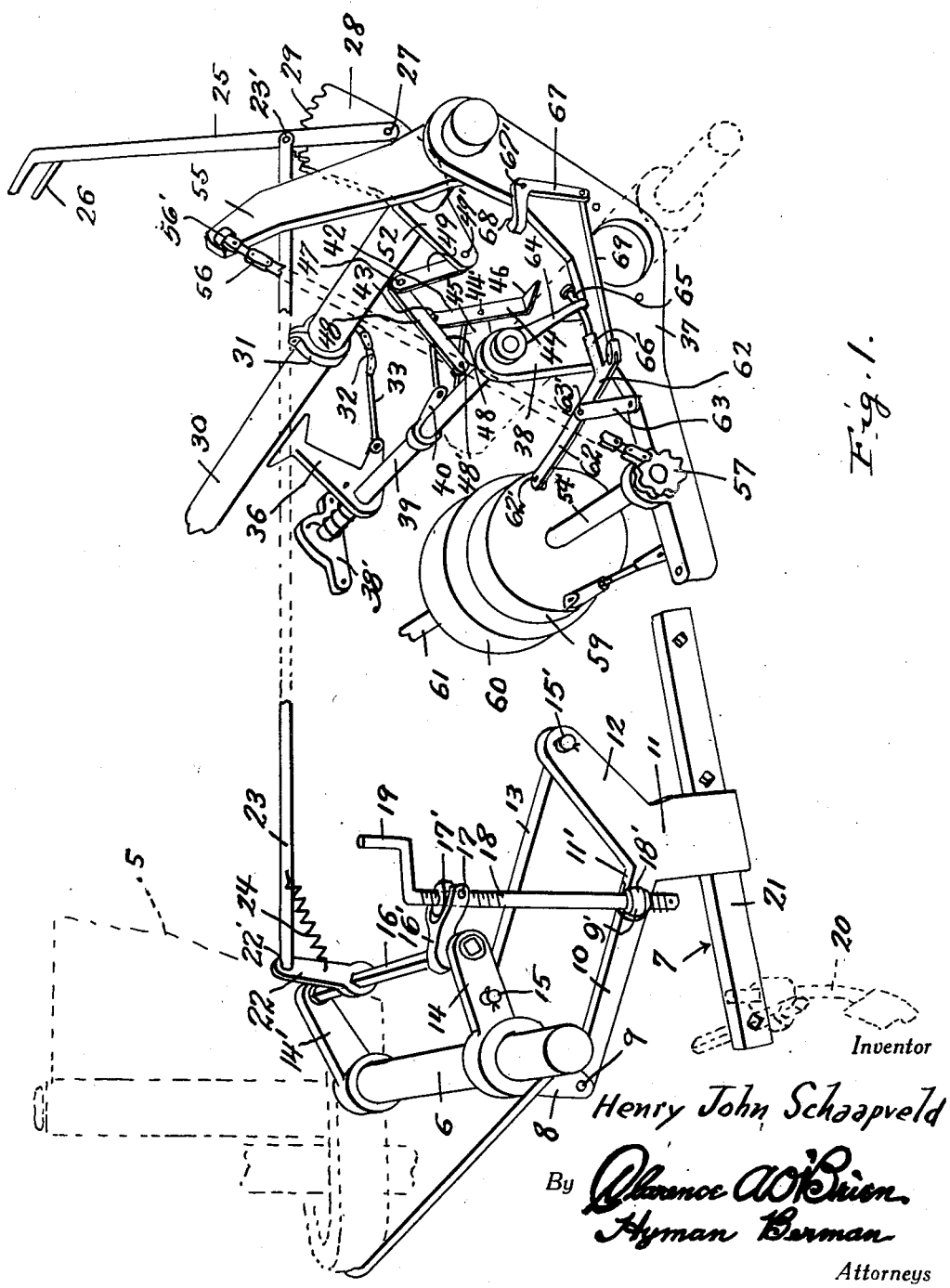
Figure 1 represents a perspective view of the lifting mechanism.

While the foregoing specification sets forth the invention in specific terms, it is to be understood that numerous changes in the shape, size and materials may be resorted to without departing from the spirit and scope of the invention as claimed hereinafter.

Referring to the drawings by numerals, the numeral 5 designates a tractor of the well known type usually equipped on one or both sides thereof with a gang of plows, or cultivator shovels, a portion only of the tractor being shown conventionally as sufficient to a proper understanding of the present invention.

According to my invention the tractor 5 is equipped with manually operative means for lifting and lowering such plows as follows:

Extending laterally from the chassis of the tractor 5, at the front end thereof, is a shaft 6 on which is mounted for vertical adjustment, by means presently described, batteries of plows, one of which is indicated at 7, and each including a plow beam 21 carrying a plurality of plows, one of which is indicated at 20 in dotted lines.

The means for mounting the battery 7 on the shaft 6 comprises an upstanding Y-shaped beam carrier 11 in the rear of the shaft 6 and having diverging legs 11' and 12, a bracket fixed to said shaft and having a pair of outstanding arms 8 and 14 thereon extending downwardly and rearwardly therefrom, respectively, and a pair of upper and lower parallel rods 10 and 13 forming a vertically swingable parallel link motion, the lower one 10 being pivoted to arm 8 and leg 11', as at 9 and 9', respectively, and the upper one 13 being similarly connected to arm 14 and leg 12, as at 15 and 15', respectively.

Manually operative means for adjusting the rods 10 and 13 are provided comprising the following: A rock shaft 30 extends laterally of the tractor 5 at the rear end thereof parallel with shaft 6, said shaft 30 being journaled in frame side bars, one of which is shown at 31. Fast on the rock shaft 30 is an upstanding detent sector 28 having a depending shank 52, for a purpose presently seen, and being toothed, as at 29. A hand lever 25 is pivoted, as at 27, to the sector 28 and provided with the usual hand release detent represented at 26 and for locking said lever to said sector. A squared rock shaft 16 is rotatably mounted at one end in the described bracket arm 14 with the other end thereof similarly mounted in a similar arm 14' fast on the shaft 6 parallel with an opposite arm 14. The shaft 16 has fast thereon a laterally projecting clevis 16' vertically swingable under rocking of the shaft 16 and to which is pivotally connected, as at 17, for movement thereon about a horizontal axis, a collar 17'. A rod-like hand crank 18 is threaded downwardly through said collar 17' with its lower end rotatably mounted in an eye bolt 18' forming part of the pivot 9', said end of the hand crank being fixed against endwise movement in said eye bolt 18' in any suitable manner. The hand lever 25 is operatively connected to said rock shaft 16 by means of a rod 23 pivoted at one end, as at 23', to said lever and having its opposite end similarly connected, as at 22', to a crank arm 22 fast on the shaft 16.

As will now be apparent, by unlocking the hand lever 25 from the sector 28 and swinging the same in the proper direction the rock shaft 16 may be operated in a direction to swing the clevis 16' upwardly thereby, through the described collar 17' and crank 18, swinging the rod 10 upwardly on its pivot 9 to elevate the beam carrier 11 and thereby lift the plow 7 out of the ground. Since the carrier 11 is also swingably connected to the fixed arm 14 by the upper rod 13, in the manner described, said carrier in its upward movement is held by said rod 13 against tilting so as to maintain the beam 21 in a substantially horizontal position for a purpose which will be manifest. On the reverse swinging of said hand lever 25 the shaft 16 is operated reversely, likewise the clevis 16', hand crank 18, and rods 10 and 13 to lower the beam 21 and permit the plows 20 to enter the ground. A spring 24 suitably connected to the crank arm 22 and rod 23 tensions the parts against such reverse operation to prevent sudden dropping of the plows.

By screwing the hand crank 18 upwardly or downwardly in the collar 17', the depth of the furrow plowed may be varied independently of operation of the hand lever 25 as will be readily understood.

The described manually operative means for lifting and lowering the plow is power-operated by means now to be described.

The usual power takeoff shaft 61 of the tractor 5 has suitably mounted thereon complemental driving and driven clutch elements 60 and 59, the latter slidable on said shaft in opposite directions into clutch engaging and disengaging positions, respectively. The clutch element 59 when engaged drives a shaft 59' journaled in the before mentioned side bar 37 and having fast thereon a sprocket wheel 57 adapted to wind up a sprocket chain 56 suitably connected at one end thereto and having its opposite end connected, as at 56', to a crank arm 55 fast on the beforementioned rock shaft 30, the arrangement being such that under such operation of the driven shaft 59', said crank arm 55 is pulled downwardly and forwardly to rock the shaft 30 and sector 28 in a direction such that if the lever 25 is locked to said sector said lever will be carried forwardly by the sector to effect the lifting of the plows just as previously described.

The driven clutch element 59 is engaged by means of a foot pedal 46 fast on a clutch engaging rock shaft 39 journaled at one end in an upright 38 on the frame bar 37 and having the other end thereof journaled in a fixed bearing 38'. The foot pedal 36 is designed to be moved downwardly and rearwardly to engage the clutch element 59, such movement thereof causing an arm 64 fast on one end of the rock shaft 39 to be thrown forwardly. The arm 64, under such movement thereof, engages an abutment 66 on a stem 65 projecting laterally from a link 62 pivoted at one end, as at 62', to the clutch element 59 and swingably mounted intermediate its ends, as at 63', on a link 63 pivoted on the side bar 37, the arrangement being such that when the arm 64 engages said abutment 66, the link 62 is swung on its pivot 62', 63' and the link 63 swung on said side bar to thrust the link 62 endwise and thereby slide clutch element 59 into clutch engaging position. The arm 64 has limited independent movement along the stem 65 for a purpose presently seen.

A clutch disengaging bell crank 67 is pivoted, as at 67', on the side bar 37 with one arm 68 thereof disposed in the path of downward movement of the crank arm 55 for operation thereby and its other arm operatively connected by a rod 69 to the link 62 so that such operation of said bell crank exerts a pull on said link 62 to reverse the described operation of said link and the link 63 and thereby slide clutch element 59 into disengaging position. As will be seen, such reverse movement of the link 62, and the link 63 is permitted by virtue of the fact that arm 64 has independent movement relative to the stem 65 and, therefore, the pedal 36 and arm 64 may be moved back to starting position while the clutch elements 60 and 59 are engaged. The pedal 36 and arm 64 are moved back towards starting position as an incident to downward movement of said crank arm 55 in degree sufficient to operate the clutch disengaging bell crank 67 and by means of a chain 32 adapted to be wound around a collar 31 fast on the shaft 30 and rotated by the latter on the rotation of said shaft incident to such movement of said crank arm 55. A suitably connected rod 33 operatively connects the chain 32 to the pedal 36. In the partially returned position thereof, said pedal 36 is movable downwardly in limited degree sufficient for a purpose presently seen, but, not sufficient to reengage the clutch elements 60 and 59 for the following reason.

As we have already seen, in the downwardly swung position of the crank arm 55 the rods 10 and 13 have been swung upwardly to lift the plow 20 out of the ground and the clutch elements 60, 59 have been disengaged. In this position of the parts, the shaft 30, sector 28, lever 25 and parts operated by the latter are locked against return movement. For this purpose locking means are provided in the form of a pair of links 48 and 49 pivoted, as at 48', to a fixed bracket 45 and to the beforementioned shank 52, as at 49', respectively, and pivoted together, as at 47, so as to assume, under rotation of the shaft 30 incident to movement of crank arm 55 into downwardly swung position, a dead center relation, as shown in Figure 2, thereby forming a toggle lock resisting return movement of said shaft 30 and adapted to be broken upwardly.

For breaking the described toggle locking means a rightangled rocker 46 is pivoted, as at 44' on said fixed bracket 45 to be rocked into engagement with said links 48, 49, under the pivot 47 thereof and thereby break said toggle lock, said clutch engaging shaft 39 being operatively connected to said rocker to operate the same under the beforementioned limited degree of downward movement of the pedal 36 and by means of a crank 40 fast on said shaft 39 and a rod suitably connected to said crank 40 and to said rocker, as at 40' and 43, respectively. As soon as the described toggle lock is broken, the parts return to normal position under gravitational action of the battery 7 as will be clear.

The operation of the invention, it is believed, will be readily understood from the foregoing without further explanation.

Having described the invention what is claimed as new is:

1. In a power driven tractor plow, a plow beam for the attachment of plows thereto, means to elevate and lower said beam including a parallel link motion vertically swingable, a foot pedal, power operated means for swinging said link motion upwardly under control of said foot pedal, means to lock said power operated means against reverse operation including a toggle lock, and means operative by said pedal to break said toggle lock.

2. In a power driven tractor plow, a plow beam for the attachment of plows thereto, means to elevate and lower said beam including a parallel link motion vertically swingable, a manipulative member, power operated means for swinging said link motion upwardly under control of said member, means to lock said power operated means against reverse operation including a toggle lock, and means operative by said member to break said toggle lock.

HENRY JOHN SCHAAPVELD.